(12) United States Patent
Wang et al.

(10) Patent No.: US 11,933,598 B2
(45) Date of Patent: Mar. 19, 2024

(54) DEVIATION DETECTION METHOD AND DEVIATION DETECTION DEVICE

(71) Applicant: CONTEMPORARY AMPEREX TECHNOLOGY CO., LIMITED, Ningde (CN)

(72) Inventors: Xuming Wang, Ningde (CN); Jiwei Chen, Ningde (CN); Yuanyuan Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/332,491

(22) Filed: Jun. 9, 2023

(65) Prior Publication Data
US 2023/0314124 A1    Oct. 5, 2023

Related U.S. Application Data

(63) Continuation of application No. PCT/CN2021/121336, filed on Sep. 28, 2021.

(51) Int. Cl.
*G01B 11/02* (2006.01)
*G01B 11/03* (2006.01)

(52) U.S. Cl.
CPC ............ *G01B 11/022* (2013.01); *G01B 11/03* (2013.01)

(58) Field of Classification Search
CPC ............................. G01B 11/022; G01B 11/03
USPC ........................................................ 702/150
See application file for complete search history.

(56) References Cited

U.S. PATENT DOCUMENTS

2016/0248115 A1*   8/2016   Hatta ................ H01M 10/0585

FOREIGN PATENT DOCUMENTS

| CN | 104197841 A | 12/2014 |
| CN | 109269420 A | 1/2019 |
| CN | 109390636 A | 2/2019 |
| CN | 109786853 A | 5/2019 |

(Continued)

OTHER PUBLICATIONS

The World Intellectual Property Organization (WIPO) International Search Report and Written Opinion for PCT/CN2021/121336 dated Jun. 7, 2022 12 pages (including English translation).

(Continued)

*Primary Examiner* — Aditya S Bhat
(74) *Attorney, Agent, or Firm* — ANOVA LAW GROUP, PLLC

(57) ABSTRACT

A deviation detection method includes obtaining first and second images of first and second electrode sheets, respectively, of an electrode assembly during winding using first and second cameras. The method further includes determining whether the first and/or second camera is deviated according to a distance from a reference point in the first and/or second image to a specific position, which is a position of a same object appearing in the first image and the second image. The method also includes determining whether the electrode assembly is deviated according to a vertical distance from the reference point in the first image to a boundary of the first electrode sheet and a vertical distance from the reference point in the second image to a boundary of the second electrode sheet if the first camera and the second camera are not deviated.

10 Claims, 7 Drawing Sheets

(56) References Cited

FOREIGN PATENT DOCUMENTS

| | | |
|---|---|---|
| JP | 3416091 B2 | 6/2003 |
| JP | 2007071964 A | 3/2007 |
| JP | 2007141590 A | 6/2007 |
| JP | 2009170136 A | 7/2009 |
| JP | 2010177068 A | 8/2010 |
| JP | 2016219352 A | 12/2016 |
| JP | 6752483 B2 | 9/2020 |

OTHER PUBLICATIONS

Korean Intellectual Property Office (KIPO) Written Decision on Registration for KR Application No. 10-2023-7015604 dated Jul. 25, 2023 8 Pages (Translation Included).

The Japan Patent Office (JPO) Decision to Grant a Patent for Application No. 2023-527050 dated Dec. 5, 2023 5 Pages(including translation).

* cited by examiner

DEVIATION DETECTION METHOD AND DEVIATION DETECTION DEVICE

CROSS-REFERENCE TO RELATED APPLICATION

This application is a continuation of International Application No. PCT/CN2021/121336, filed on Sep. 28, 2021, the entire content of which is incorporate herein by reference.

TECHNICAL FIELD

The present application relates to the field of battery manufacturing, and in particular, to a deviation detection method and a deviation detection device, for detecting positional deviation of an electrode assembly when an electrode assembly is manufactured by winding.

BACKGROUND ART

The electrode assembly, as a component of a battery cell where electrochemical reaction occurs, is generally formed by winding or stacking of a first electrode sheet, a second electrode sheet, and a separator. During a winding process of an electrode assembly, the first electrode sheet, the second electrode sheet and the separator are prone to deflect, which makes the first electrode sheet, the second electrode sheet and the separator deviate from their normal position. The winding quality of an electrode assembly directly affects the performance of a battery cell. Therefore, how to detect deviation of an electrode assembly accurately is critical to battery manufacturing.

SUMMARY

In view of the above problem, the present disclosure provides a deviation detection method and a deviation detection device, which can accurately detect positional deviation of an electrode assembly during winding.

In a first aspect, a deviation detection method is provided, used for detecting positional deviation of an electrode assembly during winding, the electrode assembly includes a first electrode sheet, a second electrode sheet, and a separator, and the deviation detection method includes: obtaining a first image and a second image through a first camera and a second camera, where the first image includes an image of the first electrode sheet of the electrode assembly during the winding process, and the second image includes an image of the second electrode sheet of the electrode assembly during the winding process; a step for determining camera deviation, which determines whether the first camera and the second camera are deviated according to distances from a reference point in the first image and a reference point in the second image to a specific position, the specific position is a position of the same object appearing in the first image and the second image; and a step for determining electrode assembly deviation, which determines whether the electrode assembly is deviated according to a vertical distance from the reference point in the first image to the boundary of the first electrode sheet and a vertical distance from the reference point in the second image to the boundary of the second electrode sheet if it is determined that the first camera and the second camera are not deviated.

Since the first electrode sheet, the second electrode sheet, and the separator are stacked after the electrode assembly is wound, and limited by the ability of a photographing unit, the positional deviation of the electrode assembly during a winding process needs to be detected by using a first image obtained by a first camera and a second image obtained by a second camera. Therefore, the premise of precisely determining the positional deviation of the electrode assembly is that the first camera and the second camera are both in correct position. In the technical solutions of the embodiments of the present application, positional deviation of the camera and positional deviation of the electrode assembly can be determined only through the first image obtained by the first camera and the second image obtained by the second camera, rather than obtaining additional images for determining positional deviation of the camera. Thus, it is possible to ensure that the first camera and the second camera are in correct position at a low cost and efficiently, and precisely determine positional deviation of the electrode assembly on this premise.

In some embodiments, the step for determining camera deviation includes: obtaining a first distance according to a first image, the first distance being a distance from a first reference point to the specific position; obtaining a second distance according to a second image, the second distance being a distance from a second reference point to the specific position; and determining that there is a relative displacement between the first camera and the second camera if the difference between the first distance and the second distance is greater than a first threshold. In the technical solutions of the embodiments of the present application, as long as the first camera and/or the second camera are not deviated, the first reference point of the first image and the second reference point of the second image respectively correspond to a fix point of the electrode assembly, and the specific position appears in both of the first image and the second image, and also corresponds to the fix point of the electrode assembly. Therefore, the difference between the distance from the first reference point to the specific position and the distance from the second reference point to the specific position is constant. Thus, by comparing the difference with the first threshold, it is easy to determine whether there is a relative displacement between the first camera and the second camera.

In some embodiments, the step for determining camera deviation includes: obtaining a first distance in the first image, where the first distance is a distance from a first reference point to the specific position, obtaining a second distance in the second image, where the second distance is a distance from a second reference point to the specific position; determining that the first camera is deviated when the first distance exceeds a reference range of the first distance, and determining that the second camera is deviated when the second distance exceeds a reference range of the second distance. Thus, by respectively comparing the first distance and the second distance with corresponding preset values, it is possible to determine whether the first camera and the second camera has a positional deviation, respectively, compared with determining a relationship between the first distance and the second distance, it is possible to determine which camera has a positional deviation more precisely.

In some embodiments, the specific position is the boundary of the separator, or the specific position is the position where laser irradiates the electrode assembly, wherein the laser is emitted by a laser generator and irradiates the electrode assembly for generating pixel boundaries in the first image and the second image. In the technical solutions of the embodiments of the present application, the separator appears in both of the first image and the second image, and the edge of the separator is beyond the edge of the first electrode sheet and the edge of the second electrode sheet, which is easy to identify. Therefore, by setting the boundary of the separator as the specific position, it is easy to determine positional deviation of the first camera and the second camera without additionally introducing other devices. In addition, the specific position may also be generated in the first image and the second image by means of laser, so as to determine positional deviation of the first camera and the second camera.

In some embodiments, the step for determining electrode assembly deviation includes: obtaining a third distance in the first image, where the third distance is a vertical distance from a third reference point to the boundary of the first electrode sheet, obtaining a fourth distance in the second image, where the fourth distance is a vertical distance from a fourth reference point to the boundary of the second electrode sheet, and when a difference between the first distance and the second distance is less than or equal to the first threshold and a difference (an absolute value) obtained from a difference between the third distance and the fourth distance minus a preset distance between the boundary of the first electrode sheet and the boundary of the second electrode sheet is greater than a second threshold value, determining that the electrode assembly is deviated. Thus, on the premise of ensuring that the first camera and the second camera are in correct position, it is possible to precisely determine whether the position of the electrode assembly is deviated during a winding process still by using the first image and the second image.

In some embodiments, the step for determining electrode assembly deviation includes: obtaining a third distance in the first image, where the third distance is a vertical distance from a third reference point to the boundary of the first electrode sheet, obtaining a fourth distance in the second image, where the fourth distance is a vertical distance from a fourth reference point to the boundary of the second electrode sheet, determining that the first electrode sheet is deviated when a difference between the first distance and the second distance is less than or equal to the first threshold and the third distance exceeds a reference range of the third distance, and determining that the second electrode sheet is deviated when a difference between the first distance and the second distance is less than or equal to the first threshold and the fourth distance exceeds a reference range of the fourth distance. Thus, by comparing the third distance and the fourth distance respectively with preset values, it is possible to determine whether the first electrode sheet and the second electrode sheet have a positional deviation, respectively, and compared with determining the relationship between the third distance and the fourth distance, it is possible to determine which electrode sheet has a positional deviation more precisely.

In some embodiments, the step for determining electrode assembly deviation includes: obtaining a third distance in the first image, where the third distance is a vertical distance from a third reference point to the boundary of the first electrode sheet, obtaining a fourth distance in the second image, where the fourth distance is a vertical distance from a fourth reference point to the boundary of the second electrode sheet, and determining that the electrode assembly is deviated when a difference (an absolute value) obtained from a difference between the third distance and the fourth distance minus a preset distance between the boundary of the first electrode sheet and the boundary of the second electrode sheet and then minus the difference between the first distance and the second distance is greater than a third threshold value. In the technical solutions of the embodiments of the present application, the difference between the first distance and the second distance is coordinate system deviation between the first image and the second image which is introduced by the first camera and the second camera. By further subtracting the difference between the first distance and the second distance from the difference between the third distance and the fourth distance, the positional deviation of the first camera and the second camera when determining the position of the electrode assembly during a winding process can be excluded, and the actual distance between the boundary of the first electrode sheet and the boundary of the second electrode sheet can be obtained, so that the positional deviation of the electrode assembly can be determined more precisely.

In some embodiments, the second camera uses an infrared light source to penetrate a layer of the separator and photograph the second electrode sheet behind it. Thus, it can be ensured that the second electrode sheet can be identified in the second image, and then the fourth distance can be obtained to compare with the third distance, thereby determining whether the electrode assembly has a positional deviation during a winding process.

In some embodiments, the separator includes a first separator and a second separator, the first image includes the first electrode sheet and the first separator, the second image includes the second electrode sheet and the second separator, and the specific position is the boundary of the second separator which is exposed from the first separator or the boundary of the first separator which is exposed from the second separator. Thus, even if the first separator and/or the second separator have/has a positional deviation, it can be ensured that the specific position in the first image corresponds to the specific position in the second image.

In a second aspect, a deviation detection device is provided, configured to detect positional deviation of an electrode assembly during a winding process, the electrode assembly comprises a first electrode sheet, a second electrode sheet, and a separator, the deviation detection device includes: a first camera and a second camera, configured to obtain a first image and a second image respectively, where the first image includes an image of the first electrode sheet of the electrode assembly during a winding process, and the second image includes an image of the second electrode sheet of the electrode assembly during a winding process; and a deviation determining unit, configured to determine whether the first camera and the second camera are deviated according to distances from a reference point in the first image and a reference point in the second image to a specific position, and determine whether the electrode assembly is deviated according to a vertical distance from the reference point in the first image to the boundary of the first electrode sheet and a vertical distance from the reference point in the second image to the boundary of a second electrode sheet when it is determined that the first camera and the second camera are not deviated.

DESCRIPTION OF DRAWINGS

The drawings described herein are intended to provide a further understanding of the present application, which constitute a part of the present application. The illustrative embodiments of the present application and the description thereof are for explaining the present application and do not constitute an undue limitation of the present application. In the drawings.

Figure 1:
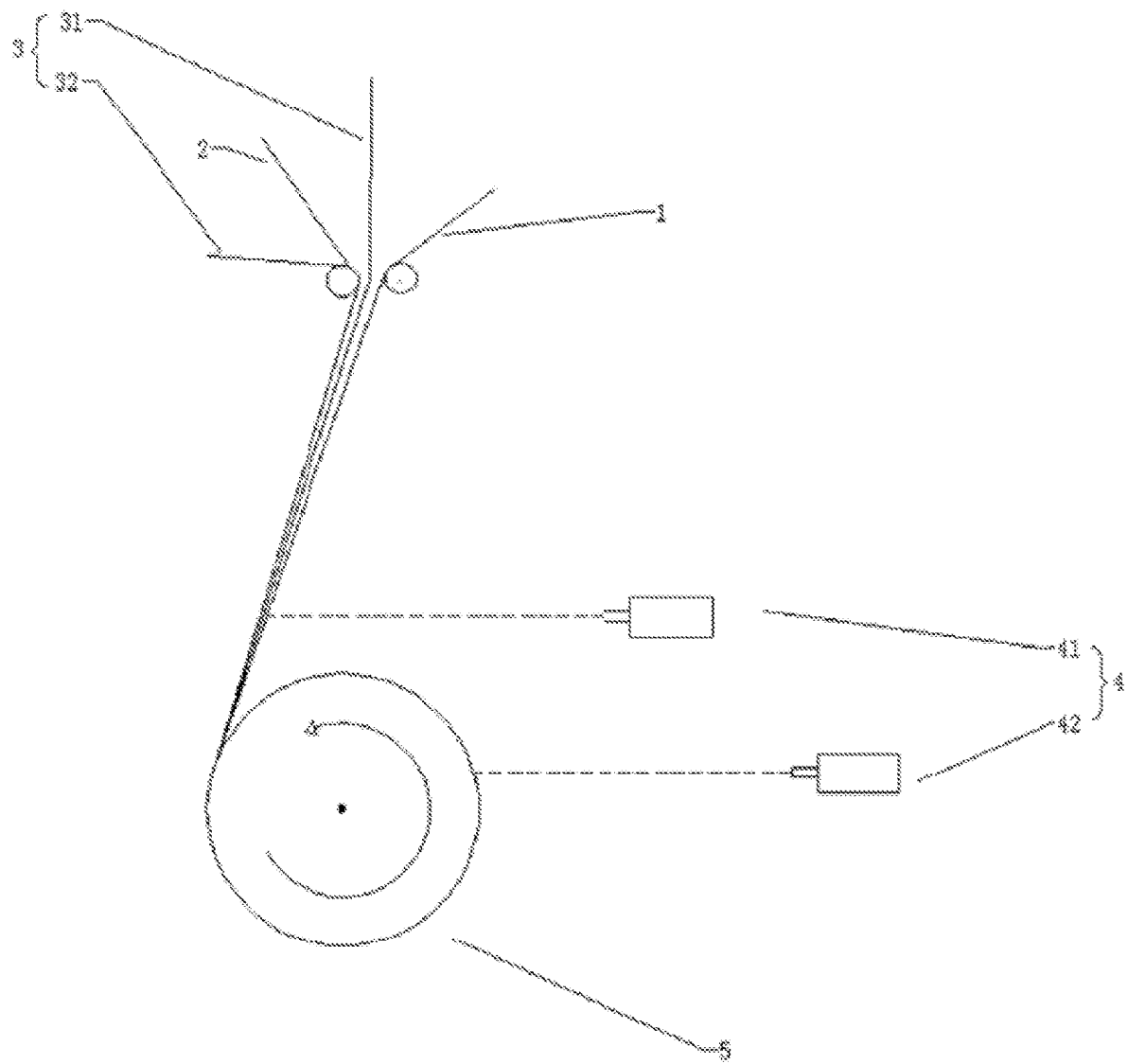
FIG. 1 is a schematic diagram of an apparatus for manufacturing an electrode assembly according to an embodiment of the present application.

DESCRIPTION OF REFERENCE NUMERALS 100 electrode assembly
1 first electrode sheet
11 first tab
2 second electrode sheet
22 second tab
3 separator
31 first separator
32 second separator
4 photographing unit
41 first camera
42 second camera
5 winding needle
6 specific position
T1 first image
T2 second image
A1 first reference point
A2 second reference point
d1 first distance
d2 second distance
d3 third distance
d4 fourth distance
200 deviation detection method

DETAILED DESCRIPTION

For the objects, technical solutions and advantages of the embodiments of the present application to be clearer, the technical solutions in the embodiments of the present application will be clearly described below in conjunction with the drawings in the embodiments of the present application, and it is apparent that the described embodiments are a part of the embodiments of the present application rather than all the embodiments. Based on the embodiments in the present application, all other embodiments obtained by those of ordinary skill in the art without creative effort fall within the protection scope of the present application.

Unless otherwise defined, all technical and scientific terms used herein have the same meaning as commonly understood by those skilled in the art belonging to the technical field of the present application; the terms used in the specification of the present application are intended only for the purpose of describing specific examples and are not intended to limit the present application; the terms "including" and "having" and any variations thereof in the specification and the claims of the present application and in the description of drawings above are intended to cover non-exclusive inclusion. The terms "first", "second", and the like in the specification and claims of the present application or the foregoing drawings are used to distinguish between different objects, but are not used to describe a specific sequence or a primary-secondary relationship.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the present application, "a plurality of" means two or more (including two), similarly, "a plurality of groups" means two or more groups (including two groups), and "a plurality of sheets" means two or more sheets (including two sheets).

Figure 2:
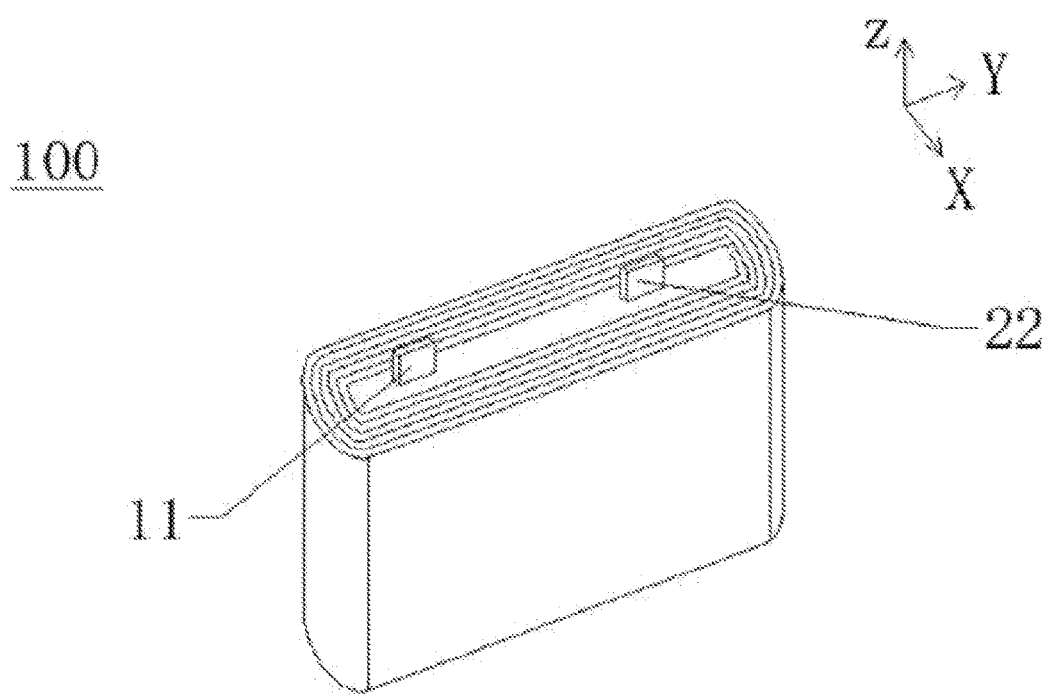
FIG. 2 is a schematic diagram of a wound electrode assembly according to an embodiment of the present application.
Figure 3:
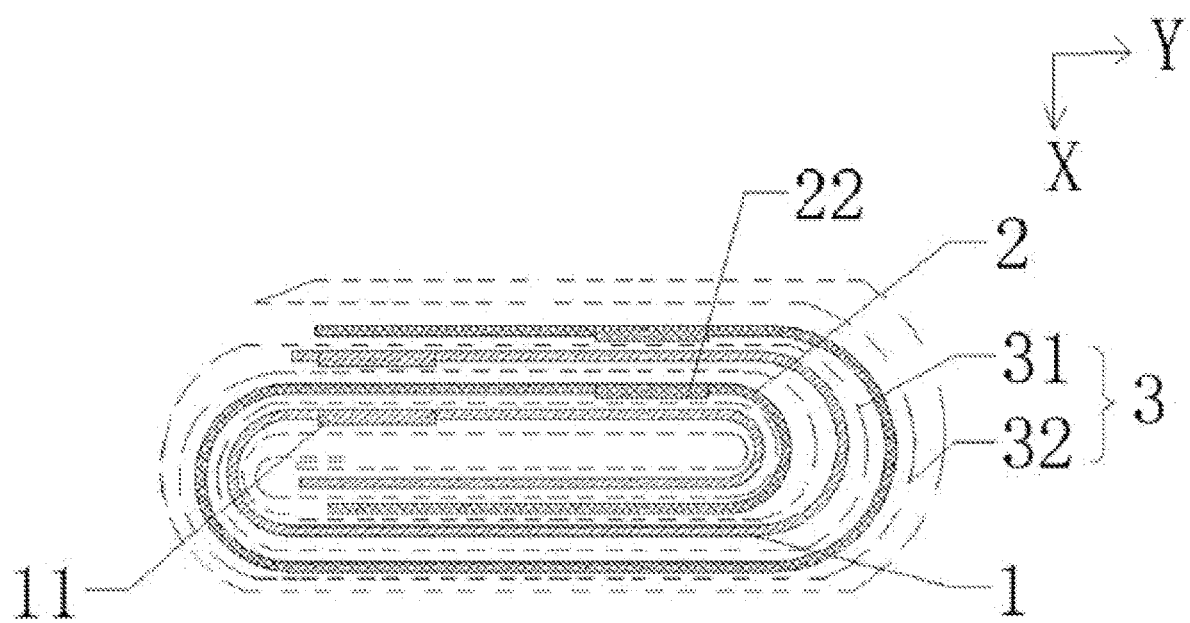
FIG. 3 is a cross-sectional view of the X-Y section of a wound electrode assembly according to an embodiment of the present application.

FIG. 1 is a schematic diagram of an apparatus for manufacturing an electrode assembly according to an embodiment of the present application. FIG. 2 illustrates an electrode assembly 100 formed by winding. As shown in FIG. 1, the apparatus for manufacturing an electrode assembly includes a conveying device and a winding device, i.e., a winding needle 5. The belt-shaped first electrode sheet 1, second electrode sheet 2, and separator 3 are conveyed to a winding needle 5 by a conveying device, and the first electrode sheet 1, the separator 3, the second electrode sheet 2, and the separator 3 are sequentially stacked and wound around the winding needle 5 and form the electrode assembly 100 (refer to FIG. 2). The winding needle 5 in FIG. 1 is merely illustrative, and the electrode assembly may be wound into an electrode assembly having a cylindrical cross section or an electrode assembly having an elliptical cross section (as shown in FIGS. 2 and 3) according to the type of a battery cell and the shape of a battery case.

Each circle (360°) the winding needle 5 rotates, the electrode assembly 100 increased by one layer. As shown in FIG. 2, the thickness of the electrode assembly 100 in the X direction increases gradually with the rotation of the winding needle 5. In addition, the width of the belt-shaped first electrode sheet 1, second electrode sheet 2, and separator 3 (including a first separator 31 and a second separator 32) determines the height of the electrode assembly 100 in the Z-axis direction. FIG. 3 is a cross-sectional view in the X-Y plane of the electrode assembly 100 shown in FIG. 2. As shown in FIG. 3, for each wound layer, from outside to inside in the X direction, the second separator 32, the second electrode sheet 2, the first separator 31, and the first electrode sheet 1 are arranged in sequence. Thus, for each winding layer, the first separator 31 and the second separator 32 separate the second electrode sheet 2 from the first electrode sheet 1.

Figure 4:
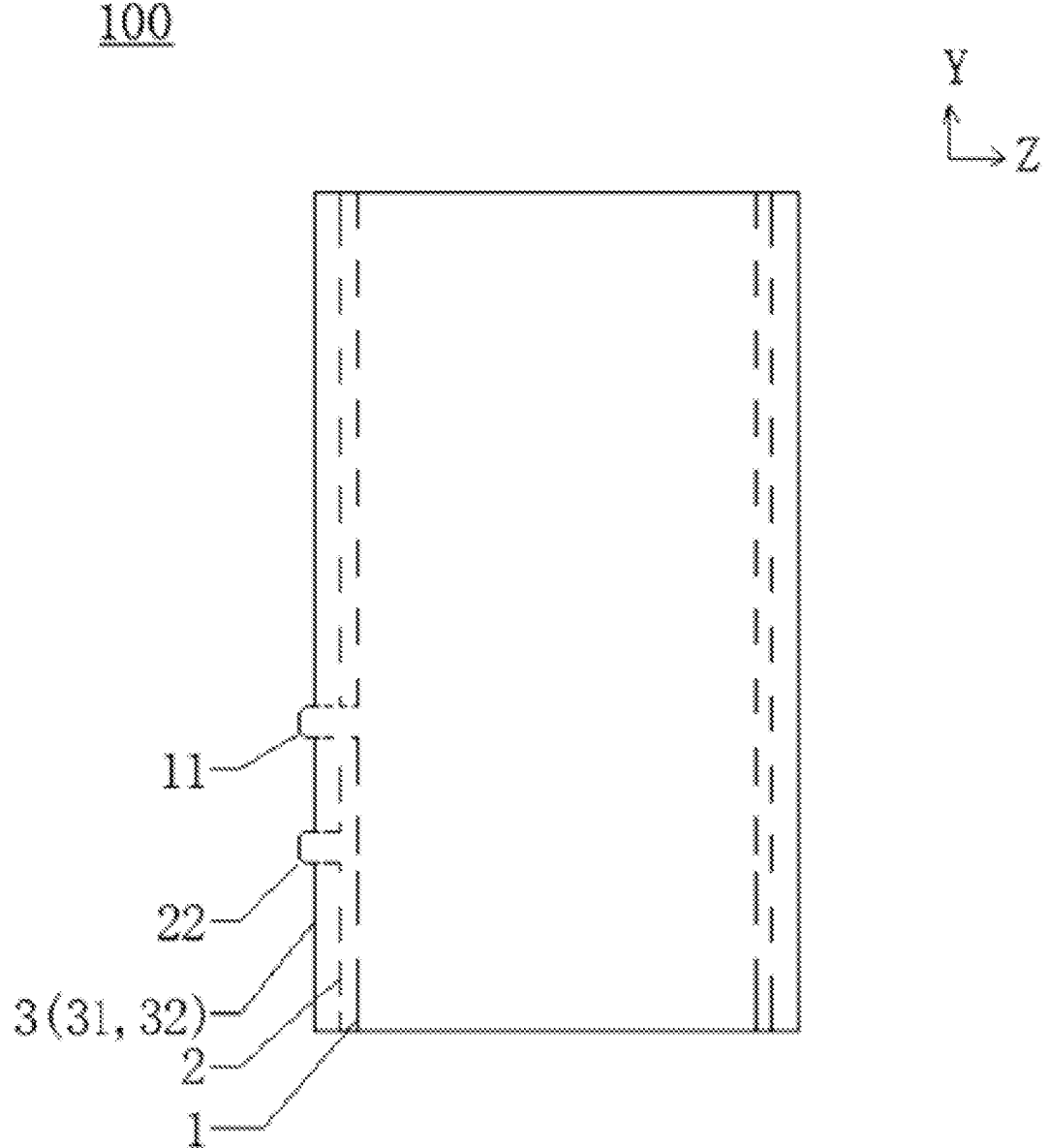
FIG. 4 is a schematic diagram of an expanded electrode assembly according to an embodiment of the present application.

An important parameter during the winding process of an electrode assembly is an alignment degree of the wound electrode assembly 100 in the Z-axis direction. Specifically, the alignment degree of the wound electrode assembly 100 in the Z-axis direction refers to the relative position between the second electrode sheet 2 and the first electrode sheet 1 in the Z-axis direction. FIG. 4 is an expended view of the stacked and wound electrode assembly 100 in the Y direction. As shown in this figure, in the Z-axis direction (i.e., the width direction of the expended electrode assembly 100), the separator 3 (including the first separator 31 and the second separator 32), the second electrode sheet 2, and the first electrode sheet 1 should be arranged in sequence from outside to inside. That is, in the Z-axis direction, the boundaries of the first separator 31 and the second separator 32 are flush and located at the outermost side, the first electrode sheet 1 is located at the innermost side, and the second electrode sheet 2 exceeds the first electrode sheet 1 by a predetermined distance (preset distance). In the winding process of the electrode assembly 100, the second electrode sheet 2 and the first electrode sheet 1 are prone to deflect, so that the relative position between the second electrode sheet 2 and the first electrode sheet 1 is deviated, thereby affecting the quality and performance of the manufactured battery cell. Therefore, in order to monitor the relative positional deviation between the second electrode sheet 2 and the first electrode sheet 1, the apparatus for manufacturing the electrode assembly further includes a photographing unit 4.

The ideal case is that the photographing unit photographs the wound electrode assembly 100, and identifies the second electrode sheet 2 and the first electrode sheet 1 in the obtained image, so as to determine the relative positional relationship between the second electrode sheet 2 and the first electrode sheet 1. However, as described above, for each wound layer of the electrode assembly, in order to photograph the first electrode sheet 1, it is necessary to penetrate the second separator 32, the second electrode sheet 2 and the first separator 31. Due to the limitations of the existing photographing unit, for example, the penetrating ability of the infrared photographing unit is very limited, and it is difficult to accurately identify the second electrode sheet 2 and the first electrode sheet 1 and determine the relative positional relationship thereof in the photographed image of the wound first electrode sheet 1 or the second electrode sheet 2. Therefore, to determine positional deviation of the electrode sheets, it is necessary to use images with the first electrode sheet 1 and the second electrode sheet 2, which are respectively corresponding to the first image T1 and the second image T2.

Therefore, the first image T1 and the second image T2 are generally taken by photographing units of the first camera 41 and the second camera 42, respectively. The first image T1 includes the first electrode sheet 1 of the electrode assembly 100 during a winding process, and the second image T2 includes the second electrode sheet 2 of the electrode assembly 100 during a winding process. However, here comes the problem that it is necessary to first ensure that the relative relationship between the coordinate system of the first image T1 and the coordinate system of the second image T2 is fixed, that is, the first camera 41 and the second camera 42 are in preset position without deviation.

Figure 5:
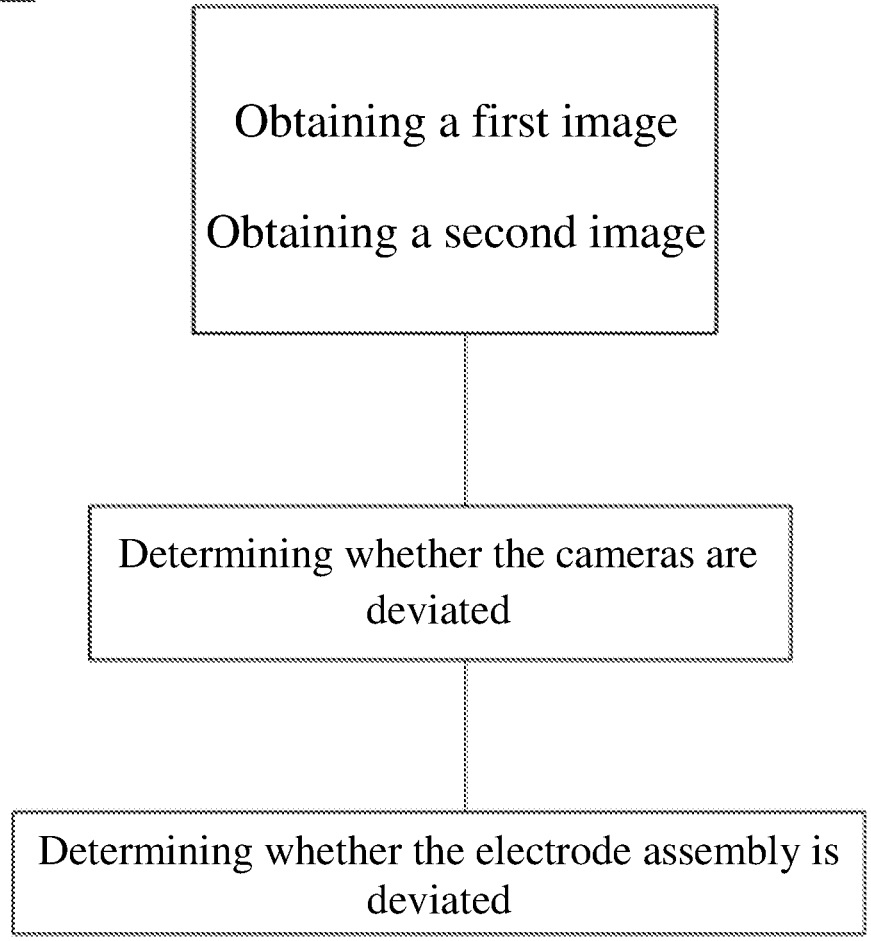
FIG. 5 is a flowchart of a deviation detection method according to an embodiment of the present application.
Figure 6:
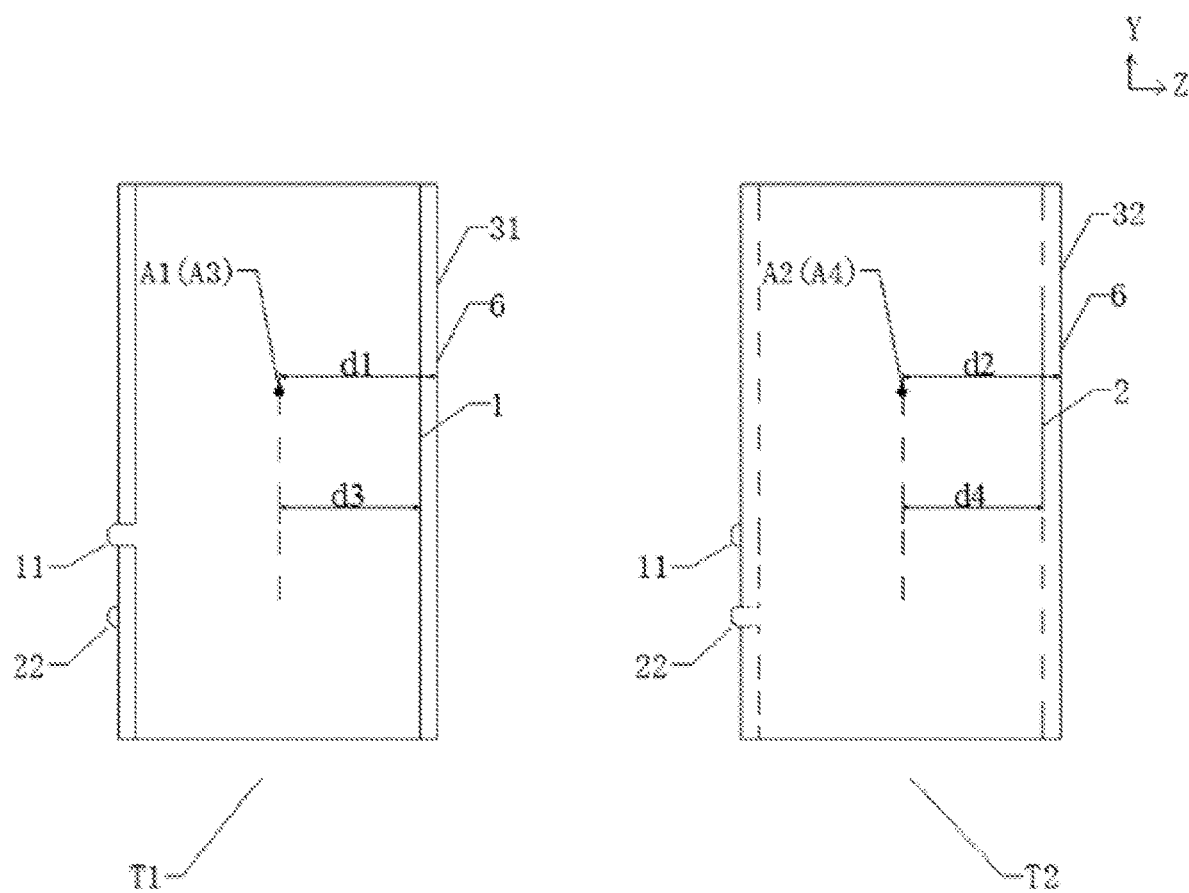
FIG. 6 is a schematic diagram of a first image and a second image according to an implementation of the present application.

Based on the above consideration, after intensive research, the inventor proposes a deviation detection method 200 for detecting positional deviation of an electrode assembly 100 during a winding process. FIG. 5 is a flowchart of a deviation detection method 200 according to an embodiment of the present application. FIG. 6 is a schematic diagram of a first image and a second image according to an implementation of the present application; As shown in FIG. 5 and FIG. 6, the deviation detection method 200 includes: obtaining a first image T1 and a second image T2 by using a first camera 41 and a second camera 42 respectively, where the first image T1 includes an image of a first electrode sheet 1 of the electrode assembly 100 during a winding process, and the second image T2 includes an image of a second electrode sheet 2 of the electrode assembly 100 during a winding process; a step for determining camera deviation, which determines whether the first camera 41 and the second camera 42 are deviated according to distances from a reference point in the first image T1 and a reference point in the second image T2 to a specific position 6, the specific position 6 is position of the same object appearing in the first image T1 and the second image T2; and a step for determining electrode assembly deviation, which determines whether the electrode assembly 100 is deviated according to a vertical distance from a reference point in the first image T1 to the boundary of the first electrode sheet 1 and a vertical distance from a reference point in the second image T2 to the boundary of the second electrode sheet 2 if it is determined that the first camera 41 and the second camera 42 are not deviated.

As described above, in order to determine whether the electrode assembly 100 is deviated, it is necessary to use the first image T1 with the first electrode sheet 1 taken by the first camera 41 and the second image T2 with the second electrode sheet 2 taken by the second camera 42. In the embodiment of the present application, the specific position 6 appears both in the first image T1 and in the second image T2 and corresponds to a fix point of the electrode assembly 100. In addition, reference points with a corresponding relationship are preset in the first image T1 and the second image T2, and as long as the first camera 41 and the second camera 42 are not deviated, the reference points in the first image T1 and the second image T2 correspond to the fix point of the electrode assembly 100, respectively, that is, the difference between the distance from the reference point in the first image T1 to the specific position 6 and the distance from the reference point in the second image T2 to the specific position 6 is fixed. Therefore, it may be determined whether the first camera 41 and the second camera 42 are deviated according to the distance from the reference point in the first image T1 to the specific position 6 and the distance from the reference point in the second image T2 to the specific position 6. Then, on the basis of determining that the first camera 41 and the second camera 42 are not deviated, whether the electrode assembly 100 is deviated is determined still by using the first image T1 and the second image T2. That is, it is not necessary to obtain additional images for determining camera positional deviation. Thus, it is possible to ensure that the first camera 41 and the second camera 42 are in the correct position at a low cost and efficiently, and precisely determine positional deviation of the electrode assembly on this premise.

According to some embodiments of the present application, the specific position 6 is the boundary of the separator 3, or the specific position 6 is the position where laser irradiates the electrode assembly, wherein the laser is emitted by a laser generator and irradiates the electrode assembly for generating pixel boundaries in the first image T1 and the second image T2. The specific position 6 shown in FIG. 6 is the boundary of the separator 3 on the side away from tabs 11 and 22, but the present application is not limited thereto, and the specific position 6 may also be the boundary of the separator 3 on the side of tabs 11 and 22. In the case where the specific position 6 is the position where laser irradiates the electrode assembly, in some embodiments one laser generator can be used, wherein the irradiation point of the laser generator can be captured by both of the first camera 41 and the second camera 42. In the present application, two laser generators may be used as well, but issues such as alignment of the two laser generators need to be considered.

As shown in FIG. 6, in the first image T1 with the electrode assembly 100 before winding, the first electrode sheet 1 is located at the outermost side in the X-axis direction, and the first separator 31, the second electrode sheet 2, and the second separator 32 are arranged under the first electrode sheet 1 in sequence. Depending on the penetrating ability of the photographing unit 4, in the first image T1, the first electrode sheet 1 and the first separator 31 can be identified. In the second image T2 with the wound electrode assembly 100, the second separator 32 is located at the outermost side in the X-axis direction, and the second electrode sheet 2, the first separator 31, and the first electrode sheet 1 are arranged under the second separator 32 in sequence. Depending on the penetrating ability of the photographing unit 4, in the second image T2, at least the second separator 32 and the second electrode sheet 2 can be identified. In addition, in the first image T1, the edge of the first separator 31 is beyond the first electrode sheet 1, and in the second image T2, the edge of the second separator 32 is beyond the edge of the second electrode sheet 2, therefore, it is easy to identify the boundary of the first separator 31 and the boundary of the second separator 32 in the first image T1 and the second image T2. In addition, as shown in FIG. 4, the boundary of the first separator 31 and the boundary of the second separator 32 are flush in the Z-axis direction, that is, the boundary of the first separator 31 in the first image T1 corresponds to the boundary of the second separator 32 in the second image T2. Therefore, the boundary of the separator 3 appears both in the first image T1 and in the second image T2, and corresponds to the same position in the electrode assembly 100. Thus, by setting the boundary of the separator 3 as the specific position, it is easy to determine positional deviation of the first camera 41 and the second camera 42 without additionally introducing other devices.

The specific position 6 may also be generated in the first image T1 and the second image T2 by laser. Thus, influences, e.g. caused by manufacturing errors of the first separator 31 and/or second separator 32 or deviation of the first separator 31 and/or second separator 32 may be excluded. In the case where the specific position 6 is the position where laser irradiates the electrode assembly, in some embodiments one laser generator can be used, wherein the irradiation point of the laser generator can be captured by both of the first camera 41 and the second camera 42.

According to some embodiments of the present application, the step for determining camera deviation of the deviation detection method 200 includes: obtaining a first distance d1 according to the first image T1, where the first distance d1 is a distance from the first reference point A1 to the specific position 6 in the Z-axis direction; obtaining a second distance d2 according to the second image T2, where the second distance d2 is a distance from the second reference point A2 to the specific position 6 in the Z-axis direction; and determining that there is a relative displacement between the first camera 41 and the second camera 42 if the difference between the first distance d1 and the second distance d2 is greater than a first threshold.

The first distance d1 is obtained by multiplying pixel points from the first reference point A1 to the specific position 6 in the Z-axis direction by a pixel equivalent, and the second distance d2 is obtained by multiplying pixel points from the second reference point A2 to the specific position 6 in the Z-axis direction by the pixel equivalent. Here, the pixel equivalent is an actual distance represented by one pixel point. For example, in the first image T1, it may be obtained by dividing the actual width of the first electrode sheet 1 in the Z axis by total amount of pixels of the first electrode sheet 1 in the first image T1.

If the first camera 41 is not deviated, once the first reference point A1 is determined, the first reference point A1 always corresponds to a fix point of the first electrode sheet 1, that is, in the first image, the distance d1 from the first reference point A1 to the specific position 6 in the Z-axis direction is fixed. Similarly, if the second camera 42 is not deviated, the distance d2 from the second reference point A2 to the specific position 6 in the Z-axis direction is also fixed. Therefore, the difference between the first distance d1 and the second distance d2 is also fixed. Generally, the probability that the first camera 41 and the second camera 42 are deviated at the same time is small. Therefore, it is not necessary to determine the positional deviations of the first camera 41 and the second camera 42 respectively, thereby improving the determination efficiency.

As shown in FIG. 6, the first reference point A1 may be determined as follows: if the first camera 41 is a line-scan camera, adjust the field of vision of the first camera 41 so that the midpoint of the first electrode sheet 1 in the Z-axis direction appears in the middle of the first image T1, that is, the midpoint of the first electrode sheet 1 in the Z-axis direction coincides with the pixel median point of the first image T1 in the Z-axis direction (for example, the first image T1 has 4096 pixels in the Z-axis direction, and the pixel median point is the 2048-th pixel point), and set the first reference point A1 to the pixel median point of the first image T1 in the Z-axis direction. The second reference point A2 may be determined likewise: adjust the field of vision of the second camera 42 so that the midpoint of the second electrode sheet 2 in the Z-axis direction coincides with the pixel median point of the second image T2 in the Z-axis direction, and set the second reference point A2 as the pixel median point of the second image T2 in the Z-axis direction. Thus, the first reference point A1 is a pixel point (the 2048-th pixel point) corresponding to the midpoint of the first electrode sheet 1 in the Z-axis direction, and the second reference point A2 is a pixel point (the 2048-th pixel point) corresponding to the midpoint of the second electrode sheet 2 in the Z-axis direction. Both of the specific position 6 of the first image T1 and the second image T2 correspond to the boundary of the separator 3, and in an ideal case, the midpoint of the first electrode sheet 1 coincides with the midpoint of the second electrode sheet 2, and in this ideal case, if the first camera 41 and the second camera 42 are not deviated, the first distance d1 from the first reference point A1 to the specific position 6 is equal to the second distance d2 from the second reference point A2 to the specific position 6. Thus, by comparing the difference therebetween with a first threshold (e.g., 0.15 mm), it can be easily determined whether there is a relative displacement between the first camera and the second camera. It should be noted that the first reference point A1 and the second reference point A2 are not limited to the pixel median point, and the first reference point A1 and the second reference point A2 may be selected arbitrarily, as long as there is a definite relationship between the first distance d1 and the second distance d2. Further, when the first camera 41 and the second camera 42 are line-scan cameras, each of the obtained first image T1 and the second image T2 is a one-dimensional line. However, the first camera 41 and the second camera 42 may not be line-scan cameras. In this case, the first image T1 and the second image T2 are two-dimensional images, that is, there is certain length in the Y direction. When the first image T1 and the second image T2 are two-dimensional images, the same operation as that of the line-scan camera can be performed on the same position in the Y direction of the first image T1 and the second image T2, or the first distance d1 and the second distance d2 may be set as the average distance in the entire Y direction.

According to some embodiments of the present application, the step for determining camera deviation of the deviation detection method 200 includes: obtaining a first distance d1 in the first image T1, where the first distance d1 is a distance from the first reference point A1 to a specific position 6 in a Z-axis direction, obtaining a second distance d2 in the second image T2, where the second distance d2 is a distance from the second reference point A2 to the specific position 6 in the Z-axis direction, determining that the first camera 41 is deviated when the first distance d1 exceeds a reference range of the first distance d1_ref; and determining that the second camera 42 is deviated when the second distance d2 exceeds a reference range of the second distance d2_ref.

Thus, by comparing the first distance d1, the second distance d2 with the preset values d1_ref and d2_ref respectively, it is possible to determine whether the first camera 41 and the second camera 42 has a positional deviation respectively, and compared with determining the relationship between the first distance d1 and the second distance d2, it is possible to determine which camera has a positional deviation more precisely.

Alternatively, the relationship between the first distance d1 and the second distance d2 may be determined first so as to determine whether the first camera 41 and the second camera 42 have a positional deviation. When it is determined that the first camera 41 and the second camera 42 have a positional deviation, a comparison between the first distance d1 and the preset value of the first distance d1_ref, and a comparison between the second distance d2 and the preset value of the second distance d2_ref are performed, so as to know which camera has a positional deviation more accurately. When it is determined that the first camera 41 and the second camera 42 do not have a positional deviation, the comparison between the first distance d1 and the preset value of the first distance d1_ref and the comparison between the second distance d2 and the preset value of the second distance d2_ref do not need to be performed, thereby improving the efficiency of deviation determination.

According to some embodiments of the present application, the step for determining electrode assembly deviation of the deviation detection method 200 includes: obtaining a third distance d3 in the first image T1, where the third distance d3 is a vertical distance from a third reference point A3 to the boundary of the first electrode sheet 1, obtaining a fourth distance d4 in the second image T2, where the fourth distance d4 is a vertical distance from a fourth reference point A4 to the boundary of the second electrode sheet 2; and determining that the electrode assembly 100 is deviated when the difference between the first distance d1 and the second distance d2 is less than or equal to a first threshold and a difference between the third distance d3 and the fourth distance d4 minus a preset distance between the boundary of the first electrode sheet 1 and the boundary of the second electrode sheet 2 is greater than a second threshold.

As described above, an important parameter during the winding process of an electrode assembly is an alignment degree in the Z-axis direction of the wound electrode assembly 100, especially the vertical distance between the boundary of the first electrode sheet 1 and the boundary of the second electrode sheet 2. When it is ensured that the first camera 41 and the second camera 42 are in the correct position (the difference between the first distance d1 and the second distance d2 is less than or equal to the first threshold), still by using the first image T1 and the second image T2, the vertical distance between the boundary of the first electrode sheet 1 and the boundary of the second electrode sheet 2 may be obtained through the difference between the third distance d3 and the fourth distance d4, and then the obtained vertical distance between the boundary of the first electrode sheet 1 and the boundary of the second electrode sheet 2 is compared with the preset distance thereof, so that whether the electrode assembly 100 has a deviation during a winding process can be precisely determined.

It should be noted that, as shown in FIG. 6, in the first image T1, the third reference point A3 may coincide with the first reference point A1. In the second image T2, the fourth reference point A4 may coincide with the second reference point A2. However, the third reference point A3 and the fourth reference point A4 are not limited thereto, as long as there is a definite relationship between the third distance d3 and the fourth distance d4.

According to some embodiments of the present application, the step for determining electrode assembly deviation of the deviation detection method 200 includes: obtaining a third distance d3 in the first image T1, where the third distance d3 is a vertical distance from the third reference point A3 to the boundary of the first electrode sheet 1, and obtaining a fourth distance d4 in the second image T2, where the fourth distance d4 is a vertical distance from the fourth reference point A4 to the boundary of the second electrode sheet 2; when the difference between the first distance d1 and the second distance d2 is less than or equal to a first threshold and the third distance d3 exceeds a reference range of the third distance d3_ref, it is determined that the first electrode sheet 1 is deviated; and when the difference between the first distance d1 and the second distance d2 is less than or equal to the first threshold and the fourth distance d4 exceeds a reference range of the fourth distance d4_ref, it is determined that the second electrode sheet 2 is deviated. Thus, by comparing the third distance d3 and the fourth distance d4 with the preset values d3_ref and d4_ref respectively, it is possible to determine whether the first electrode sheet 1 and the second electrode sheet 2 has a positional deviation respectively, and compared with determining the relationship between the third distance d3 and the fourth distance d4, it is possible to determine which electrode sheet has a positional deviation more precisely.

Alternatively, the relationship between the third distance d3 and the fourth distance d4 may be first determined so as to determine whether the electrode assembly 100 has a positional deviation during a winding process. When it is determined that the electrode assembly 100 has a positional deviation during a winding process, a comparison between the third distance d3 and the third distance preset value d3_ref and a comparison between the fourth distance d4 and the fourth distance preset value d4_ref may be performed so as to know which electrode sheet has a positional deviation more accurately. When it is determined that the electrode assembly 100 does not have a positional deviation during a winding process, there is no need to compare the third distance d3 and the fourth distance d4 with the preset values d3_ref and d4_ref respectively, thereby improving the efficiency of deviation determination.

According to some embodiments of the present application, the step for determining electrode assembly deviation of the deviation detection method 200 includes: obtaining a third distance d3 in the first image T1, where the third distance d3 is a vertical distance from the third reference point A3 to the boundary of the first electrode sheet 1, obtaining a fourth distance d4 in the second image T2, where the fourth distance d4 is a vertical distance from the fourth reference point A4 to the boundary of the second electrode sheet 2, and when a difference between the third distance d3 and the fourth distance d4 minus a preset distance between the boundary of the first electrode sheet and the boundary of the second electrode sheet minus the difference between the first distance d1 and the second distance d2 is greater than a third threshold value, determining that the electrode assembly is deviated.

Figure 7:
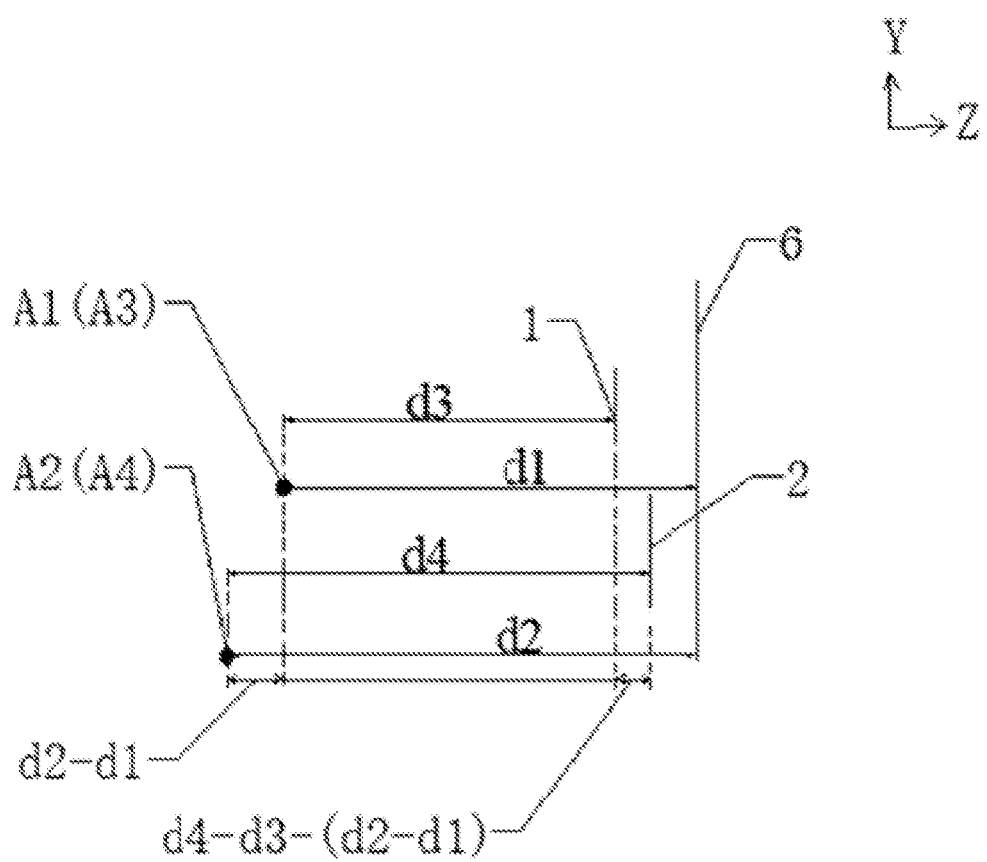
FIG. 7 is a diagram illustrating an actual deviation of an electrode assembly when positional deviation of a first camera and a second camera within an acceptable range according to an implementation of the present application.

As shown in FIG. 7, when the position of the first camera 41 and/or the second camera 42 is slightly deviated, but d1-d2 is less than the first threshold, in this case, the deviation between the boundary of the first electrode sheet 1 and the boundary of the second electrode sheet 2 obtained by the difference between the third distance d3 and the fourth distance d4 includes two parts, that is, a coordinate system deviation d1-d2 in the first and the second images T1 and T2 caused by the first camera 41 and the second camera 42, and an actual deviation between the boundary of the first electrode sheet 1 and the boundary of the second electrode sheet 2. Therefore, the actual deviation between the boundary of the first electrode sheet 1 and the boundary of the second electrode sheet 2 is equal to the difference between the third distance d3 and the fourth distance d4 minus the difference between the first distance d1 and the second distance d2. Thus, it is possible to exclude the influence of the positional deviation of the first camera 41 and the second camera 42, and determine the positional deviation of the electrode assembly 100 more precisely.

In FIG. 7, a case in which the first reference point A1 coincides with the third reference point A3 and the second reference point A2 coincides with the fourth reference point A4 is shown. It should be understood that, the present application is not limited thereto, and the first to the fourth reference points A1 to A4 can be selected arbitrarily, as long as d3 and d4 obtained from the third reference point A3 and the fourth reference point A4 have a definite correspondence relationship, and d1 and d2 obtained from the first reference point A1 and the second reference point A2 have a definite correspondence relationship, and d1-d2 is a coordinate system deviation between the first and the second images T1 and T2 which is caused by the first camera 41 and the second camera 42.

According to some embodiments of the present application, the second camera 42 uses an infrared light source to penetrate a layer of the separator and photograph the second electrode sheet 2 behind it. As described above (refer to FIG. 6), in the second image T2, the second electrode sheet 2 is located under the second separator 32. Thus, by using an infrared camera that is capable of penetrating the second separator 32, it can be ensured that the second electrode sheet 2 can be identified in the second image T2, and then the fourth distance d4 can be obtained to compare with the third distance d3, thereby determining whether the electrode assembly 100 has a positional deviation during a winding process.

According to some embodiments of the present application, the separator 3 includes a first separator 31 and a second separator 32, the first image T1 includes a first electrode sheet 1 and the first separator 31, the second image T2 includes a second electrode sheet 2 and the second separator 32, and the specific position 6 is the boundary of the second separator 32 which is exposed from the first separator 31 or the boundary of the first separator 31 which is exposed from the second separator 32.

Figure 8:
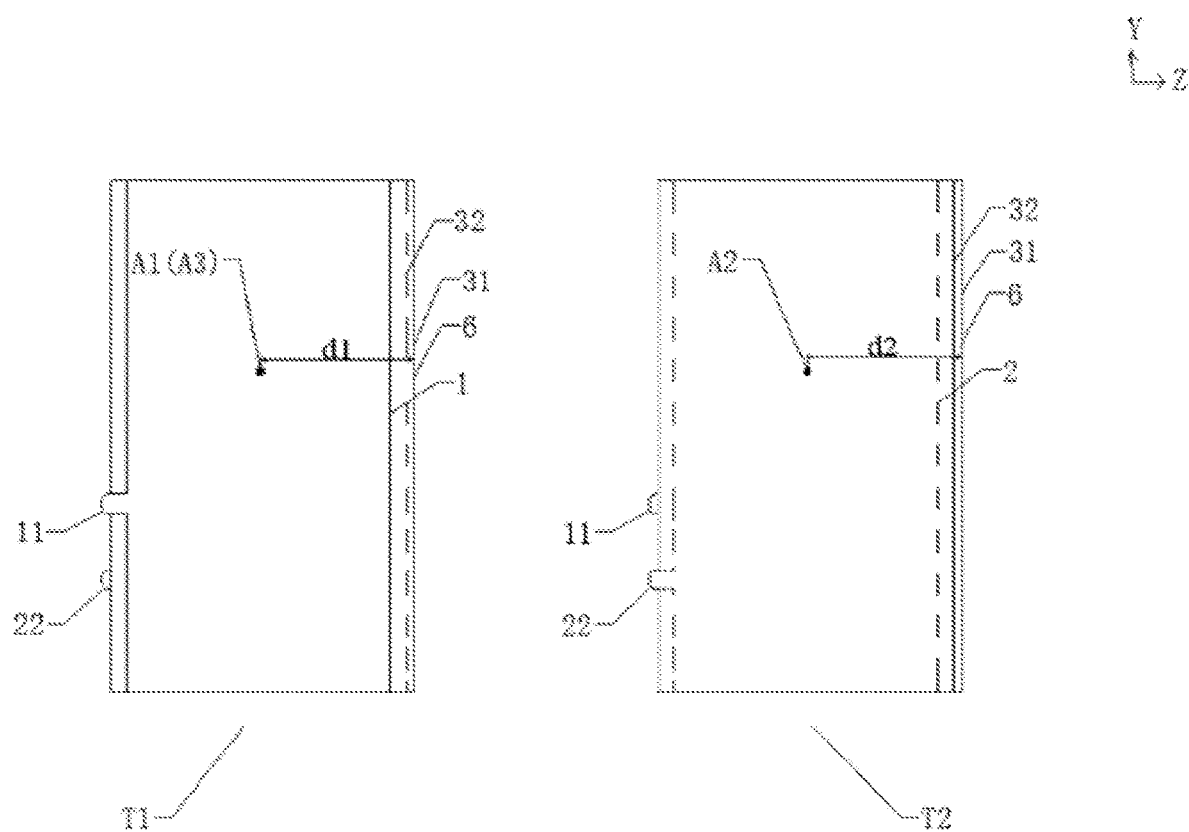
FIG. 8 is a diagram illustrating a specific position when a first separator is exposed from a second separator according to an implementation of the present application.

FIG. 8 shows an example in which the first separator 31 is exposed from the second separator 32. As can be seen from FIG. 8, in the first image T1, the first separator 31 is above the second separator 32, so that the boundary of the first separator 31 can be identified and used as the specific position 6. In the second image T2, although the first separator 31 is located below the second separator 32, since the first separator 31 is exposed from the second separator 32, the boundary of the first separator 31 can also be identified in the second image T2 and used as the specific position 6. Thus, the specific position 6 in the first image T1 and the specific position 6 in the second image T2 correspond to each other, both being the boundary of the first separator 31. It is the same when the boundary of the second separator 32 is exposed from the boundary of the first separator. Thus, even if the first separator 31 and/or the second separator 32 have a positional deviation, it can be ensured that the specific position 6 in the first image T1 corresponds to the specific position 6 in the second image T2, and both correspond to the same position of the electrode assembly 100.

According to some embodiments of the present application, the time of obtaining the second image T2 is later than the time of obtaining the first image T1, and the time difference is set according to the photographing position of the first camera 41 and the second camera 42 and the winding speed of the electrode assembly 100. Thus, by adjusting the time difference, the first electrode sheet 1 and the second electrode sheet 2 in the same position after winding can be displayed in the captured first image T1 and second image T2, so that positional deviation detection of the first electrode sheet 1 and the second electrode sheet 2 in the same position can be performed, and the detection result can be more precise.

According to some embodiments of the present application, a deviation detection device is provided, which is configured to detect positional deviation of an electrode assembly during a winding process, where the electrode assembly 100 includes a first electrode sheet 1, a second electrode sheet 2, and a separator 3, the deviation detection device includes: a first camera 41 and a second camera 42, configured to obtain a first image T1 and a second image T2 respectively, where the first image T1 includes an image of the first electrode sheet 1 of the electrode assembly 100 during a winding process, and the second image T2 includes an image of the second electrode sheet 2 of the electrode assembly 100 during a winding process; and a deviation determining unit, which is configured to determine whether the first camera 41 and the second camera 42 are deviated according to distances from a reference point in the first image T1 and a reference point in the second image T2 to a specific position 6, and determine whether the electrode assembly 100 is deviated according to a vertical distance from the reference point in the first image T1 to the boundary of the first electrode sheet 1 and a vertical distance from the reference point in the second image T2 to the boundary of the second electrode sheet 2 if it is determined that the first camera 41 and the second camera 42 are not deviated.

According to some embodiments of the present application, referring to FIG. 1 to FIG. 6, the present application provides a deviation detection method 200, including the following steps:

obtaining a first image T1 and a second image T2 by using a first camera 41 and a second camera 42, where the first image T1 includes an image of a first electrode sheet 1 of an electrode assembly 100 during a winding process, and the second image T2 includes an image of a second electrode sheet 2 of the electrode assembly 100 during a winding process;

setting a first reference point A1 in the first image T1 to a pixel median point in the Z-axis direction of the first image T1 (for example, for a line-scan camera having 4096 pixels in the Z-axis direction, the pixel median point is the 2048-th pixel point), setting a second reference point A2 in the second image T2 to a pixel median point in the Z-axis direction of the second image T2, and setting a specific position 6 to the boundary of a separator 3. Thus, a first distance d1 from the first reference point A1 to the boundary of the separator 3 in the first image T1 and a second distance d2 from the second reference point A2 to the specific position 6 in the second image T2 are obtained. It is determined whether the first camera 41 and/or the second camera 42 are/is deviated by comparing the first distance d1 and the second distance d2 with a first threshold. When the first camera 41 and/or the second camera 42 are/is deviated, d1 and a preset value of the first distance d1_ref, and d2 and a preset value of the second distance d2_ref are further compared, so as to more accurately determine which one of the first camera 41 and the second camera 42 is deviated.

When it is determined that the first camera 41 and the second camera 42 are not deviated, it is determined whether the electrode assembly 100 is deviated. In the first image T1, a third reference point A3 is set to coincide with the first reference point A1, and in the second image T2, a fourth reference point A4 is set to coincide with the second reference point A2. Thus, a third distance d3 which is from the third reference point A3 (the first reference point A1) in the first image T1 to the boundary of the first electrode sheet 1 and a fourth distance d4 which is from the fourth reference point A4 (the second reference point A2) in the second image T2 to the boundary of the second electrode sheet 2 are obtained. At this time, d3-d4-(d1-d2) is the actual deviation between the boundary of the first electrode sheet 1 and the boundary of the second electrode sheet 2, that is, the actual deviation of the electrode assembly 100 after the influence of the first camera 41 and the second camera 42 is excluded. Accordingly, it is possible to determine whether the electrode assembly 100 is deviated more precisely.

Finally, it should be noted that the present application is not limited to the to the above embodiments. The above embodiments are merely examples, and the embodiments having substantially the same composition as the technical idea within the technical solutions of the present application and exhibiting the same effect are all included within the technical scope of the present application. In addition, other ways that can be constructed by applying various modifications that can be conceived by a person skilled in the art to the embodiments without departing from the subject matter of the present application, and combining some of the constituent elements in the embodiments are also included in the scope of the present application.

What is claimed is:

1. A deviation detection method, wherein
it is used to detect positional deviation of an electrode assembly during winding, the electrode assembly comprising a first electrode sheet, a second electrode sheet and a separator,
the deviation detection method includes:
obtaining a first image and a second image using a first camera and a second camera, the first image comprises an image of a first electrode sheet of an electrode assembly during winding, and the second image comprises an image of a second electrode sheet of the electrode assembly during winding;
determining camera deviation, comprising determining whether the first camera and/or the second camera is deviated according to a distance from a reference point in the first image to a specific position and/or a distance from a reference point in the second image to the specific position, the specific position being a position of a same object appearing in the first image and the second image; and
determining electrode assembly deviation, comprising determining whether the electrode assembly is deviated according to a vertical distance from the reference point in the first image to a boundary of the first electrode sheet and a vertical distance from the reference point in the second image to a boundary of the second electrode sheet in response to determining that the first camera and the second camera are not deviated.

2. The deviation detection method according to claim 1, wherein determining the camera deviation comprises:
obtaining a first distance according to the first image, the first distance being a distance from a first reference point to the specific position;
obtaining a second distance according to the second image, the second distance being a distance from a second reference point to the specific position; and
determining that there is a relative displacement between the first camera and the second camera in response to a difference between the first distance and the second distance being greater than a threshold.

3. The deviation detection method according to claim 2, wherein:
determining the electrode assembly deviation comprises:
obtaining a third distance according to the first image, the third distance being a vertical distance from a third reference point to the boundary of the first electrode sheet;
obtaining a fourth distance according to the second image, the fourth distance being a vertical distance from a fourth reference point to the boundary of the second electrode sheet; and determining that the electrode assembly is deviated in response to the difference between the first distance and the second distance being less than or equal to the first threshold and a difference between the third distance and the fourth distance minus a preset distance between the boundary of the first electrode sheet and the boundary of the second electrode sheet being greater than a second threshold.

4. The deviation detection method according to claim 2, wherein determining the electrode assembly deviation comprises:
obtaining a third distance according to the first image, the third distance being a vertical distance from a third reference point to the boundary of the first electrode sheet;
obtaining a fourth distance according to the second image, the fourth distance being a vertical distance from a fourth reference point to the boundary of the second electrode sheet; and
determining that the first electrode sheet is deviated in response to the difference between the first distance and the second distance being less than or equal to the threshold and the third distance exceeds a reference range of the third distance; and
determining that the second electrode sheet is deviated in response to the difference between the first distance and the second distance being less than or equal to the threshold and the fourth distance exceeds a reference range of the fourth distance.

5. The deviation detection method according to claim 2, wherein: determining the electrode assembly deviation comprises:
obtaining a third distance from the first image, the third distance being a vertical distance from a third reference point to the boundary of the first electrode sheet;
obtaining a fourth distance from the second image, the fourth distance being a vertical distance from a fourth reference point to the boundary of the second electrode sheet; and
determining that the electrode assembly is deviated in response to a difference between the third distance and the fourth distance minus a preset distance between the boundary of the first electrode sheet and the boundary of the second electrode sheet and minus the difference between the first distance and the second distance being greater than a third threshold value.

6. The deviation detection method according to claim 1, wherein determining the camera deviation comprises:
obtaining a first distance according to the first image, the first distance being a distance from a first reference point to the specific position;
obtaining a second distance according to the second image, the second distance being a distance from a second reference point to the specific position;
determining that the first camera is deviated in response to the first distance exceeding a reference range of the first distance; and
determining that the second camera is deviated in response to the second distance exceeding a reference range of the second distance.

7. The deviation detection method according to claim 1, wherein:
the specific position is a boundary of a separator of the electrode assembly or a position where laser irradiates the electrode assembly; and
the laser is emitted by a laser generator and irradiates the electrode assembly for generating pixel boundaries in the first image and the second image.

8. The deviation detection method according to claim 1, wherein:
the second camera uses an infrared light source to penetrate a layer of the separator and photograph the second electrode sheet behind the separator.

9. The deviation detection method according to claim 1, wherein:
the separator comprises a first separator and a second separator;
the first image comprises the first electrode sheet and the first separator;
the second image comprises the second electrode sheet and the second separator; and
the specific position is a boundary of the second separator that is exposed from the first separator or a boundary of the first separator that is exposed from the second separator.

10. A deviation detection device, wherein
it is used to detect positional deviation of an electrode assembly during winding, the electrode assembly comprising a first electrode sheet, a second electrode sheet and a separator, and
the deviation detection device comprises:
a first camera and a second camera for obtaining a first image and a second image respectively, the first image comprising an image of a first electrode sheet of an electrode assembly during winding;
the second image comprising an image of a second electrode sheet of the electrode assembly during winding; and
a deviation determining unit configured to:
determine whether the first camera and the second camera are deviated according to a distance from a reference point in the first image to a specific position and a distance from a reference point in the second image to the specific position; and
determine whether the electrode assembly is deviated according to a vertical distance from the reference point in the first image to a boundary of the first electrode sheet and a vertical distance from the reference point in the second image to a boundary of the second electrode sheet in response to determining that the first camera and the second camera are not deviated.

* * * * *